(12) United States Patent
Zhou et al.

(10) Patent No.: US 9,839,050 B2
(45) Date of Patent: Dec. 5, 2017

(54) FAST INITIAL LINK SETUP DISCOVERY (FD) FRAME TRANSMISSION

(71) Applicant: QUALCOMM Incorporated, San Diego, CA (US)

(72) Inventors: Yan Zhou, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 15/000,900

(22) Filed: Jan. 19, 2016

(65) Prior Publication Data

US 2016/0219617 A1 Jul. 28, 2016

Related U.S. Application Data

(60) Provisional application No. 62/107,093, filed on Jan. 23, 2015.

(51) Int. Cl.
*H04W 72/12* (2009.01)
*H04W 8/00* (2009.01)
*H04W 48/12* (2009.01)
*H04W 88/08* (2009.01)

(52) U.S. Cl.
CPC ....... *H04W 72/1273* (2013.01); *H04W 8/005* (2013.01); *H04W 48/12* (2013.01); *H04W 72/1284* (2013.01); *H04W 88/08* (2013.01)

(58) Field of Classification Search
CPC . H04W 72/1273; H04W 8/005; H04W 48/12; H04W 72/1284
See application file for complete search history.

(56) References Cited

U.S. PATENT DOCUMENTS

| 2007/0253353 | A1 | 11/2007 | Korus |
| 2013/0294232 | A1 | 11/2013 | Segev et al. |
| 2014/0064128 | A1 | 3/2014 | Park et al. |

OTHER PUBLICATIONS

International Search Report and Written Opinion for International Application No. PCT/US2016/014123, ISA/EPO, dated Apr. 21, 2016, 15 pages.
Wang, L., "Ad hoc discussions 802.11ai Passive Scanning" Interdigital Communications, Jul. 2012, IEEE, Piscataway, NJ, 17 pages.

*Primary Examiner* — Ronald B Abelson
(74) *Attorney, Agent, or Firm* — Toler Law Group, PC.

(57) ABSTRACT

A method includes receiving data at a first access point. The method also includes generating, at the first access point, a transmission schedule based on the data. The transmission schedule indicates when the first access point is to transmit a fast initial link setup discovery (FD) frame. The method further includes selectively transmitting, from the first access point, FD frames based on the transmission schedule.

30 Claims, 6 Drawing Sheets

502
Receive data at a first access point

504
Generate, at the first access point, a transmission schedule based on the data, the transmission schedule indicating when the first access point is to transmit a fast initial link setup discovery (FD) frame

506
Selectively transmit, from the first access point, FD frames based on the transmission schedule

FAST INITIAL LINK SETUP DISCOVERY (FD) FRAME TRANSMISSION

I. CLAIM OF PRIORITY

The present application claims priority from U.S. Provisional Patent Application No. 62/107,093 entitled "FAST INITIAL LINK SETUP DISCOVERY (FD) FRAME TRANSMISSION," filed Jan. 23, 2015, the contents of which are incorporated by reference in their entirety.

II. FIELD

The present disclosure is generally related to fast initial link setup discovery (FD) frame transmission.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Electronic devices, such as wireless telephones, may use access points (APs) to access networks in order to transmit and receive data or to exchange information. For example, mobile electronic devices (e.g., stations) that are in close proximity to an access point (AP) may associate with the AP to access a network. An access point may periodically transmit a beacon to announce a presence of a wireless network (e.g., a local area network (LAN)). The beacon may include information (e.g., a timestamp, capability information, etc.) that a station (STA) may use to access the wireless network. For example, the STA may synchronize a local clock based on the timestamp.

A STA may enter a coverage area of the AP during a beacon interval between transmission of a first beacon and transmission of a second beacon by the AP. Because the STA does not know when the second beacon is to be transmitted by the AP, the STA may have to substantially continuously monitor a (physical) communication channel for the second beacon until the second beacon is detected or until timing out. Accordingly, the STA consumes power to monitor the communication channel even when the AP is not transmitting the second beacon. Also, if the STA times out before the second beacon is detected, the STA may be unable to associate with the AP.

IV. SUMMARY

The present disclosure is directed to fast initial link setup discovery (FD) frame transmission. A first beacon of an AP may indicate a target beacon transmit time (TBTT) at which the AP is scheduled to transmit a second beacon. For example, the first beacon may include a beacon interval that indicates an offset between a transmission time of the first beacon and the TBTT. The AP may generate an FD frame to advertise the TBTT during the beacon interval between transmission of the first beacon and transmission of the second beacon. For example, the FD frame may include a TBTT offset that indicates a difference between a transmission time of the FD frame and the TBTT. An FD frame may be smaller (e.g., occupy fewer bits) than a beacon. The AP may periodically transmit the FD frame. For example, the AP may transmit a beacon at a first frequency (e.g., once every 100 milliseconds (ms)) and the AP may transmit an FD frame at a second frequency (e.g., once every 20ms).

A STA may begin monitoring a (physical) communication channel during the beacon interval. The STA may determine the TBTT in response to receiving the FD frame. The TBTT may be derivable based on an FD reception time of the FD frame and the TBTT offset. For example, the STA may determine the TBTT based on a first time that the FD frame is received at the STA and the TBTT offset indicated by the FD frame. To illustrate, the STA may add the first time and the TBTT offset to determine the TBTT. The STA may reduce power consumption by refraining from monitoring the communication channel until a time just prior to the TBTT. The STA may monitor the communication channel at approximately the TBTT and may receive the second beacon from the AP. For example, the STA may monitor the communication channel from the time just prior to the TBTT until timing out or receiving the second beacon from the AP. FD frames may be generated at a higher frequency than beacons. As a result, a timeout duration of monitoring the communication channel while scanning for an FD frame, a beacon, or both, may be reduced. The STA may thus conserve resources by monitoring the communication channel for a shorter duration before timing out. When the FD frame is detected, the STA may conserve resources by refraining from monitoring the communication channel until the time just prior to the TBTT.

In a particular example, the AP may transmit a first beacon at a first time and may receive a neighbor beacon from a first neighbor AP at a second time. The neighbor beacon may indicate a first neighbor beacon interval of the first neighbor AP. The first neighbor AP may be within a coverage area of the AP. The AP may determine that the TBTT of the AP corresponds to a sum of the first time and a beacon interval of the AP. The AP may determine a first neighbor TBTT offset based on a difference between the first time and the second time. The AP may determine a first neighbor TBTT based on the first neighbor TBTT offset. For example, the AP may determine that the first neighbor TBTT corresponds to a sum of the TBTT of the AP and the first neighbor TBTT offset. In a particular example, the AP may determine the first neighbor TBTT based on the first neighbor beacon interval. For example, the AP may determine that the first neighbor TBTT corresponds to a sum of the second time and the first neighbor beacon interval. The AP may determine that the first neighbor TBTT offset corresponds to a difference between the TBTT and the first neighbor TBTT.

In a particular example, a STA may receive a first beacon from the AP at a first time and may receive a second beacon from a second neighbor AP at a second time. The second beacon may include a second neighbor beacon interval of the second neighbor AP. The STA may determine a second neighbor TBTT offset of the second neighbor AP based on a difference between the first time and the second time. The STA may send a beacon report (e.g., a STA report) to the AP. The beacon report may include the second neighbor TBTT offset, the second neighbor beacon interval, or both. The AP may determine that the first beacon has been transmitted at a first transmission time and that a first TBTT of the AP corresponds to a sum of the first transmission time and a beacon interval of the AP. The AP may receive the beacon report and may determine a second neighbor TBTT of the second neighbor AP based on the second neighbor TBTT offset, the second neighbor beacon interval, or both. For example, the AP may determine that the second neighbor TBTT corresponds to a sum of the first TBTT and the second neighbor TBTT offset. As another example, the AP may determine that the second neighbor TBTT corresponds to a sum of the first transmission time, the second neighbor TBTT offset, and the second neighbor beacon interval.

The AP may generate a neighbor report (NR) that advertises the first neighbor TBTT of the first neighbor AP, the second neighbor TBTT of the second neighbor AP, or both. The AP may include the NR in an FD frame, a beacon, or both. For example, the AP may include the NR in a beacon. The NR in the beacon may indicate the first neighbor TBTT offset, the second neighbor TBTT offset, or both. A STA that receives the NR in a beacon from the AP at a first time may determine the first neighbor TBTT by adding the first time and the first neighbor TBTT offset, may determine the second neighbor TBTT by adding the first time and the second neighbor TBTT offset, or both.

As another example, the AP may include the NR in an FD frame. The NR in the FD frame may advertise the first neighbor TBTT, the second neighbor TBTT, or both, as offsets relative to a transmission time of the FD frame. For example, the AP may determine a first neighbor FD TBTT offset (or a second neighbor FD TBTT offset) between the transmission time of the FD frame and the first neighbor TBTT (or the second neighbor TBTT). To illustrate, the AP may determine that a first beacon has been transmitted at a first time. The AP may determine that an FD offset indicates a difference between the first time and the transmission time of the FD frame. The AP may determine the first neighbor FD TBTT offset based on a difference between the FD offset and the first neighbor TBTT offset. The first neighbor FD TBTT offset may indicate a difference between the first neighbor TBTT and the transmission time of the FD frame. The AP may determine the second neighbor FD TBTT offset based on a difference between the FD offset and the second neighbor TBTT offset. The second FD TBTT offset may indicate a difference between the second neighbor TBTT and the transmission time of the FD frame. A STA that receives the NR in an FD frame from the AP at a first time may determine the first neighbor TBTT by adding the first time and the first neighbor FD TBTT offset, may determine the second neighbor TBTT by adding the first time and the second neighbor FD TBTT offset, or both. A TBTT of an AP may thus be advertised via a beacon of the AP, an FD frame of the AP, a neighbor beacon of a neighbor AP, or an FD frame of the neighbor AP.

A STA within a coverage area of the AP and the neighbor AP may receive advertisements of the TBTT of the AP from both the AP and the neighbor AP. In a geographical area where there is a dense deployment of APs, the TBTT advertisements may increase contention and medium occupancy. For example, one or more communication channels may be occupied at various times by transmissions of the TBTT advertisements.

The AP may generate an FD frame transmission schedule based on data associated with a set of APs within a geographical area. The data may indicate whether the TBTT of the AP is receivable at one or more locations from the set of APs, when the TBTT is scheduled to be receivable at the one or more locations from one or more of the set of APs, or a combination thereof. For example, a device at a particular location, of the one or more locations, may receive the TBTT of the AP from the set of APs. The AP may generate the FD frame transmission schedule so that the TBTT of the AP is receivable at each of a plurality of locations (e.g., from the AP, from one or more neighbor APs, or a combination thereof) at least once during one or more time windows of a particular duration (e.g., 20 milliseconds). For example, a device at a particular location, of the plurality of locations, may receive the TBTT of the AP at least once during the one or more time windows. The particular duration may correspond to a first duration of a scan window of a STA. The AP may transmit an FD frame based on the FD frame transmission schedule. In a particular example, the AP may refrain from transmitting the FD frame in response to determining that the FD frame transmission schedule indicates that no FD frame is to be transmitted. The FD frame transmission schedule may indicate that no FD frame is to be transmitted because the TBTT of the AP is receivable at each of the plurality of locations in a beacon of the AP, a neighbor beacon of the neighbor APs, or a combination thereof, at least once during the one or more time windows.

In a particular aspect, a method for communication includes receiving data at a first access point. The method also includes generating, at the first access point, a transmission schedule based on the data. The transmission schedule indicates when the first access point is to transmit a fast initial link setup discovery (FD) frame. The method further includes selectively transmitting, from the first access point, FD frames based on the transmission schedule.

In another particular aspect, a computer-readable storage device stores instructions that, when executed by a processor, cause the processor to perform operations including receiving data at a first access point. The operations also include generating, at the first access point, a transmission schedule based on the data. The transmission schedule indicates when the first access point is to transmit a fast initial link setup discovery (FD) frame. The operations further include selectively transmitting, from the first access point, FD frames based on the transmission schedule.

In another particular aspect, an access point includes a transmitter, a receiver, and a fast initial link setup discovery (FD) frame generator. The receiver is configured to receive data. The FD frame generator configured to generate a transmission schedule based on the data. The transmission schedule indicates when the transmitter is to transmit an FD frame. The FD frame generator is also configured to selectively transmit, via the transmitter, FD frames based on the transmission schedule.

One particular advantage provided by at least one of the disclosed methods is that an AP may conserve network resources by transmitting an FD frame based on an FD frame transmission schedule. The AP may transmit fewer FD frames based on the FD frame transmission schedule when data associated with a set of access points indicates that a TBTT of the AP is receivable at one or more locations within a coverage area of the AP from at least one of the set of access points.

Other aspects, advantages, and features of the present disclosure will become apparent after review of the entire application, including the following sections: Brief Description of the Drawings, Detailed Description, and the Claims.

VI. DETAILED DESCRIPTION

Figure 1:
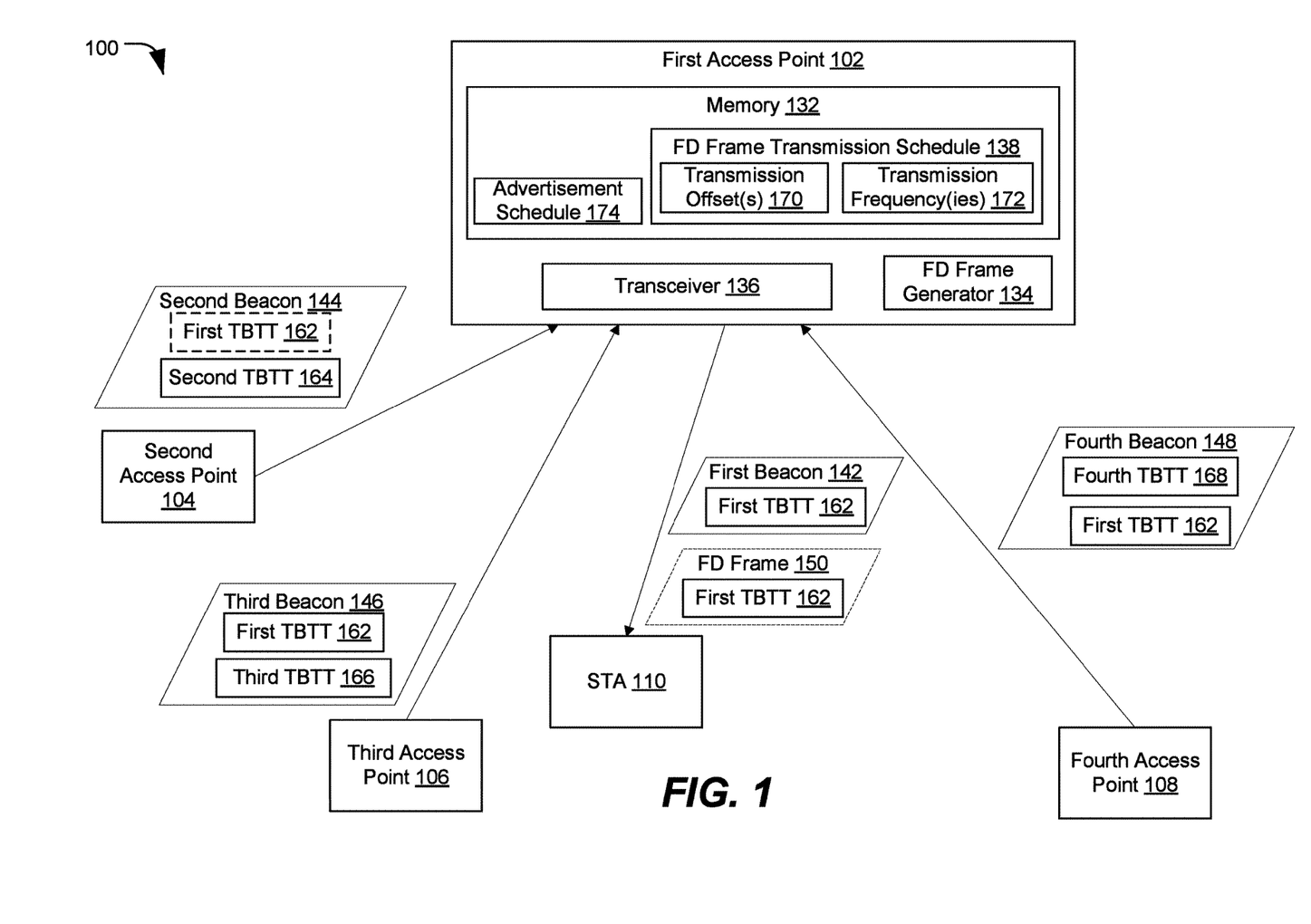
FIG. 1 is a block diagram of a particular illustrative aspect of a system that includes an access point that generates an FD frame transmission schedule.

Referring to FIG. 1, a particular illustrative aspect of a system is disclosed and generally designated 100. The system 100 includes one or more APs. For example, the system 100 includes a first AP 102, a second AP 104, a third AP 106, and a fourth AP 108. The system 100 may include one or more stations (STAs). For example, the system 100 includes a STA 110.

The system 100 is illustrated for convenience only and the particular illustrated details are not limiting. For example, in other aspects, the system 100 may include more electronic devices (e.g., APs, STAs, or both) or fewer electronic devices than illustrated in FIG. 1, and the electronic devices may be located at different locations than illustrated in FIG. 1. One or more of the first AP 102, the second AP 104, the third AP 106, and the fourth AP 108 may include an FD frame generator 134, a transceiver 136, a memory 132, or a combination thereof.

The first AP 102, the second AP 104, the third AP 106, the fourth AP 108, the STA 110, or a combination thereof, may include or correspond to at least one of an access point, a station, a communications device, a computer, a mobile device, a personal digital assistant (PDA), a set top box, a music player, a video player, an entertainment unit, or a navigation device.

Figure 6:
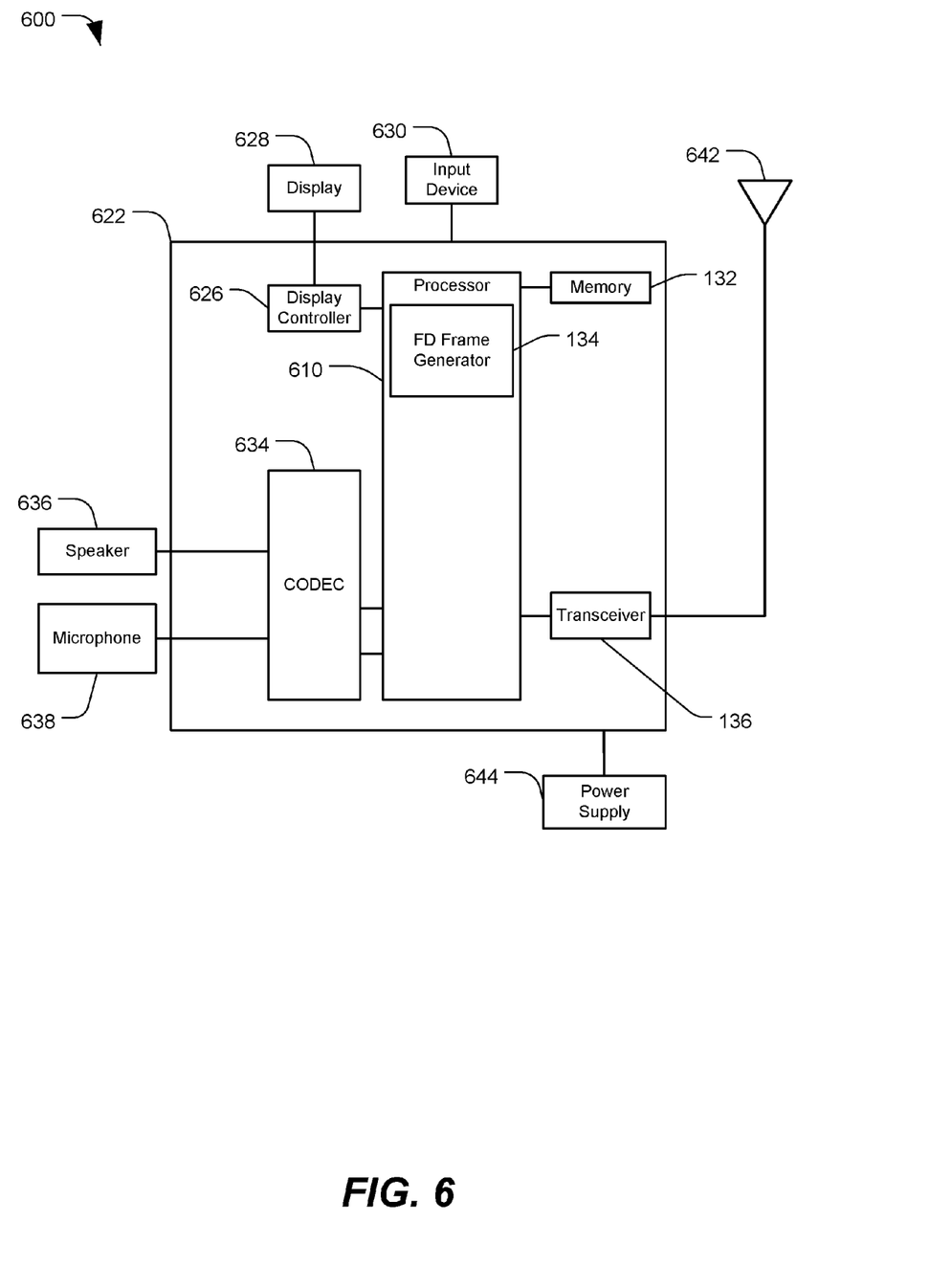
FIG. 6 is a block diagram of a device that is operable to support various aspects of one or more methods, systems, apparatuses, and computer-readable media disclosed herein.

At least one of the first AP 102, the second AP 104, the third AP 106, the fourth AP 108, or the STA 110 may include a processor (e.g., a central processing unit (CPU), a digital signal processor (DSP), a network processing unit (NPU), etc.), a memory 132 (e.g., a random access memory (RAM), a read-only memory (ROM), etc.), and a wireless interface configured to send and receive data via one or more wireless networks (e.g., one or more wireless communication channels), as further described with reference to FIG. 6. The wireless interface may communicate with a transceiver 136 (e.g., a wireless receiver and a wireless transmitter). Although certain operations described herein may be described with reference to a "transceiver," in other aspects a "receiver" may perform data receiving operations and a "transmitter" may perform data transmitting operations.

At least one of the first AP 102, the second AP 104, the third AP 106, the fourth AP 108, or the STA 110 may be configured to operate in accordance with one or more wireless protocols, standards, or both, such as an Institute of Electrical and Electronics Engineers (IEEE) 802.11 standard. For example, at least one of the first AP 102, the second AP 104, the third AP 106, the fourth AP 108, or the STA 110 may operate in accordance with at least one of an IEEE 802.11a, b, g, n, s, aa, ac, ad, ae, af, ah, ai, aj, aq, ax, or mc standard.

During operation, the first AP 102 may generate a first beacon 142 to advertise a presence of a wireless network (e.g., a LAN). The first beacon 142 may include communication information (e.g., capability information, a timestamp, etc.) of the first AP 102. A STA (e.g., the STA 110) may use the communication information to access, via the first AP 102, the wireless network. The timestamp (e.g., a beacon transmission timestamp) may indicate a first time indicated by a local clock of the first AP 102 when the first beacon 142 is transmitted by the first AP 102. The first beacon 142 may advertise a first TBTT 162 of the first AP 102. For example, the first beacon 142 may include a first beacon interval (e.g., 100 milliseconds) that indicates an offset between the first time and a second time of the local clock of the first AP 102 at which a subsequent beacon is scheduled to be transmitted by the first AP 102. The first TBTT 162 may correspond to the second time.

The second AP 104, the third AP 106, and the fourth AP 108 may operate in a similar fashion as the first AP 102. For example, the second AP 104 may generate a second beacon 144, the third AP 106 may generate a third beacon 146, and the fourth AP 108 may generate a fourth beacon 148, as shown in FIG. 1. The second beacon 144 may advertise a second TBTT 164 of the second AP 104. The third beacon 146 may advertise a third TBTT 166 of the third AP 106. The fourth beacon 148 may advertise a fourth TBTT 168 of the fourth AP 108.

The first TBTT 162 may indicate a time at which a subsequent beacon of the first AP 102 is scheduled to be transmitted. An electronic device, such as the APs 104-108 and the STA 110, that receives the first beacon 142 may determine the first TBTT 162 by adding the first beacon interval to a time at which the first beacon 142 is received. For example, the STA 110 may receive the first beacon 142 at a beacon reception time of a local clock of the STA 110. The first TBTT 162 may be derivable based on the beacon reception time and the first beacon interval. For example, the STA 110 may determine the first TBTT 162 by adding the beacon reception time and the first beacon interval indicated by the first beacon 142. Similarly, the second TBTT 164 may correspond to a time at which a subsequent beacon of the second AP 104 is scheduled to be transmitted, the third TBTT 166 may correspond to a time at which a subsequent beacon of the third AP 106 is scheduled to be transmitted, and the fourth TBTT 168 may correspond to a time at which a subsequent beacon of the fourth AP 108 is scheduled to be transmitted.

The first AP 102 may transmit, via the transceiver 136, the first beacon 142 at the first beacon interval (e.g., once every 100 ms). The second AP 104 may transmit the second beacon 144 at a second beacon interval. The third AP 106 may transmit the third beacon 146 at a third beacon interval. The fourth AP 108 may transmit the fourth beacon 148 at a fourth beacon interval. The first beacon 142, the second beacon 144, the third beacon 146, and the fourth beacon 148 may be transmitted at various times. One or more of the first beacon interval, the second beacon interval, the third beacon interval, and the fourth beacon interval may be distinct from each other.

A particular AP (e.g., the first AP 102, the second AP 104, the third AP 106, or the fourth AP 108) may receive one or more neighbor beacons from one or more neighbor APs. For example, the second AP 104 may receive the first beacon 142, the third AP 106 may receive the first beacon 142, and the fourth AP 108 may receive the first beacon 142. The particular AP may receive one or more beacon reports from one or more STAs. For example, the fourth AP 108 may receive a beacon report (e.g., a STA report) from the STA 110. The particular AP may generate an NR based on the one or more neighbor beacons, the one or more beacon reports, or a combination thereof.

The particular AP may determine a neighbor TBTT offset of a neighbor AP based on a beacon from the neighbor AP, a beacon report from a STA, or both. For example, the fourth AP 108 may transmit the fourth beacon 148 at a beacon transmission time of a local clock of the fourth AP 108. The fourth AP 108 may receive the first beacon 142 at a beacon reception time of the local clock of the fourth AP 108. The first beacon 142 may include a first beacon interval of the first AP 102. The fourth AP 108 may determine the fourth TBTT 168 based on a sum of the beacon transmission time and a fourth beacon interval of the fourth AP 108. The fourth AP 108 may determine a first TBTT offset of the first AP 102 based on a difference between the beacon transmission time and the beacon reception time. The first TBTT offset may indicate the first TBTT 162 relative to the fourth TBTT 168. The fourth AP 108 may determine the first TBTT 162 based on a sum of the fourth TBTT 168 and the first TBTT offset. The first TBTT 162 may correspond to a sum of the beacon reception time and the first beacon interval. In a particular example, the fourth AP 108 may determine the first TBTT 162 based on a sum of the beacon reception time and the first beacon interval. In this example, the fourth AP 108 may determine that the first TBTT offset corresponds to a difference between the fourth TBTT 168 and the first TBTT 162.

As another example, the STA 110 may be within a coverage area of the first AP 102 and the fourth AP 108. The STA 110 may receive the first beacon 142 at a first beacon reception time and the fourth beacon 148 at a second beacon reception time. The first beacon 142 may include a first beacon interval of the first AP 102. The STA 110 may provide a beacon report to the fourth AP 108. The beacon report may include a first TBTT offset indicating a difference between the first beacon reception time and the second beacon reception time. The first TBTT offset may indicate the first TBTT 162 relative to the fourth TBTT 168. The beacon report may also include the first beacon interval.

In a particular aspect, the fourth AP 108 may be outside a coverage area of the first AP 102 and may not receive the first beacon 142. The fourth AP 108 may determine the first TBTT offset, the first beacon interval, or both, based on the beacon report in response to determining that a beacon (e.g., the first beacon 142) has not been received from the first AP 102 during a particular window. For example, the fourth AP 108 may determine the first TBTT offset, the first beacon interval, or both, based on the beacon report in response to determining that a beacon (e.g., the first beacon 142) has not been received from the first AP 102 within a particular duration of transmitting a beacon from the fourth AP 108. Even though the fourth AP 108 is outside a coverage area of the first AP 102, the fourth AP 108 may be considered a neighbor AP of the first AP 102 if there is at least one STA (e.g., the STA 110) that is within a coverage area of the first AP 102 and the fourth AP 108.

The fourth AP 108 may generate an NR indicating that the fourth AP 108 received the first beacon 142 from the first AP 102, that the fourth AP 108 received the beacon report from the STA 110, or both. The NR may indicate the first TBTT 162. For example, the NR may include the first TBTT offset, the first beacon interval, or both. The fourth AP 108 may generate the fourth beacon 148. The fourth beacon 148 may advertise the first TBTT 162 of the first AP 102, the fourth TBTT 168, or both. For example, the fourth beacon 148 may include the NR in an NR information element (IE). As another example, the fourth beacon 148 may indicate the fourth TBTT 168. For example, the fourth beacon 148 may indicate a beacon interval between transmissions of the fourth beacon 148 by the fourth AP 108. The fourth AP 108 may transmit the fourth beacon 148. The second AP 104, third AP 106, or both, may operate in a similar fashion as the fourth AP 108. For example, the second AP 104 may generate the second beacon 144 and the third AP 106 may generate the third beacon 146.

The first AP 102 may receive, via the transceiver 136, data associated with the second AP 104, the third AP 106, the fourth AP 108, or a combination thereof. For example, the first AP 102 may receive, via the transceiver 136, the second beacon 144 from the second AP 104, the third beacon 146 from the third AP 106, the fourth beacon 148 from the fourth AP 108, or a combination thereof. As another example, the first AP 102 may receive, via the transceiver 136, a beacon report from the STA 110. The beacon report may include data (e.g., a neighbor TBTT offset, a neighbor beacon interval, or both) associated with the second AP 104, the third AP 106, the fourth AP 108, or a combination thereof.

The second AP 104, the third AP 106, the fourth AP 108, or a combination thereof, may be within a geographical area. For example, the second AP 104, the third AP 106, the fourth AP 108, or a combination thereof, may be within a coverage area of the first AP 102. As another example, the second AP 104, the third AP 106, the fourth AP 108, or a combination thereof, may be within a STA coverage area of a STA that is within an AP coverage area of the first AP 102. The STA coverage area and the AP coverage area may overlap. To illustrate, the second AP 104 may be within a first STA coverage area of a first STA and the third AP 106 may be within a second STA coverage area of a second STA. The first STA and the second STA may be within an AP coverage area of the first AP 102. The first AP 102 may receive a first beacon report from the first STA and may receive a second beacon report from the second STA. The first beacon report may indicate a first neighbor TBTT offset, a first neighbor beacon interval, or both, associated with the second AP 104. The second beacon report may indicate a second neighbor TBTT offset, a second neighbor beacon interval, or both, associated with the third AP 106.

The data received by the first AP 102 may indicate whether the first TBTT 162 is advertised by the second AP 104, the third AP 106, the fourth AP 108, or a combination thereof. For example, the FD frame generator 134 may determine that the first TBTT 162 is advertised by the second AP 104 in response to determining that the second beacon 144 indicates the first TBTT 162. The FD frame generator 134 may determine that the first TBTT 162 is advertised by the second AP 104 in response to determining that the second beacon 144 includes a first beacon interval of the first AP 102, a first TBTT offset indicating a difference between a transmission time of the second beacon 144 and the first TBTT 162, or both. The first TBTT 162 may be derivable based on the first TBTT offset and the second TBTT 164.

The data may indicate when the first TBTT 162 is scheduled to be advertised by one or more of the second AP 104, the third AP 106, and the fourth AP 108. For example, the FD frame generator 134 may determine that the first TBTT 162 is scheduled to be advertised by the second AP 104 at the second TBTT 164 in response to determining that the second beacon 144 indicates that the second AP 104 is scheduled to transmit a subsequent beacon at the second TBTT 164. The FD frame generator 134 may determine that the second beacon 144 is received by the first AP 102 at a first beacon reception time. The second beacon 144 may include a second beacon interval of the second AP 104. The second TBTT 164 may be derivable based on the first beacon reception time and the second beacon interval. For example, the FD frame generator 134 may determine the second TBTT 164 by adding the first beacon reception time and the second beacon interval. The FD frame generator 134 may assume that the subsequent beacon to be transmitted by the second AP 104 is likely to indicate the first TBTT 162 in response to determining that the second beacon 144 indicates the first TBTT 162.

The FD frame generator 134 may determine advertisement schedules corresponding to a plurality of locations within a coverage area of the first AP 102. For example, the FD frame generator 134 may generate an advertisement schedule 174 indicating when the first TBTT 162 is receivable at a first location within a coverage area of the first AP 102. To illustrate, the advertisement schedule 174 may indicate when a device at the first location receives the first TBTT 162.

The FD frame generator 134 may determine the plurality of locations based on receiving a beacon, a beacon report, or both. For example, the FD frame generator 134 may determine that the plurality of locations includes a location of a STA (e.g., the STA 110) in response to receiving a beacon report from the STA (e.g., the STA 110). As another example, the FD frame generator 134 may determine that the plurality of locations includes a location of a particular AP in response to receiving a beacon from the particular AP. To illustrate, the FD frame generator 134 may determine that the plurality of locations includes a location of the second AP 104 in response to receiving the second beacon 144, a location of the third AP 106 in response to receiving the third beacon 146, a location of the fourth AP 108 in response to receiving the fourth beacon 148, or a combination thereof. The FD frame generator 134 may generate an advertisement schedule corresponding to each of the plurality of locations. For example, the FD frame generator 134 may generate the advertisement schedule 174 for a first location of the plurality of locations.

The advertisement schedule 174 may indicate times at which the first TBTT 162 is receivable at the first location from one or more of the first AP 102, the second AP 104, the third AP 106, and the fourth AP 108. The FD frame generator 134 may determine that the first TBTT 162 is receivable at the first location in response to determining that an advertisement (e.g., a beacon or an FD frame) indicating the first TBTT 162 from at least one of the first AP 102, the second AP 104, the third AP 106, or the fourth AP 108 is decodable by a STA at the first location. The advertisement schedule 174 may indicate the first TBTT 162 because the first TBTT 162 is going to be advertised by a beacon (e.g., the first beacon 142) of the first AP 102.

The FD frame generator 134 may assume that the first TBTT 162 advertised by the beacon (e.g., the first beacon 142) of the first AP 102 is receivable at the first location within the coverage area of the first AP 102. For example, the FD frame generator 134 may generate the advertisement schedule 174 for devices that receive beacons (e.g., the first beacon 142) from the first AP 102 because those devices are also likely to receive an FD frame from the first AP 102. The FD frame generator 134 may ignore devices that are unable to receive beacons (e.g., the first beacon 142) from the first AP 102 in generating the advertisement schedule 174 because those devices are also unlikely to receive an FD frame from the first AP 102.

The FD frame generator 134 may assume that the beacon (e.g., the first beacon 142) of the first AP 102 is decodable by a STA (e.g., the STA 110) within a coverage area of the first AP 102. For example, the FD frame generator 134 may generate the advertisement schedule 174 for devices that are able to decode beacons (e.g., the first beacon 142) from the first AP 102 because those devices are also likely to be able to decode an FD frame received from the first AP 102. The FD frame generator 134 may ignore STAs that are unable to decode beacons (e.g., the first beacon 142) from the first AP 102 in generating the advertisement schedule 174 because those devices are also unlikely to be able to decode an FD frame received from the first AP 102. The FD frame generator 134 may generate the advertisement schedule 174 to indicate the first TBTT 162.

The FD frame generator 134 may determine whether additional beacons (e.g., the second beacon 144, the third beacon 146, or the fourth beacon 148) indicate the first TBTT 162 and are receivable at the first location. The FD frame generator 134 may disregard a particular beacon in generating the advertisement schedule 174 in response to determining that the particular beacon excludes the first TBTT 162. For example, the FD frame generator 134 may disregard the second beacon 144 in response to determining that the second beacon 144 does not indicate the first TBTT 162. Alternatively, the FD frame generator 134 may generate (or update) the advertisement schedule 174 based on determining that a particular beacon indicates the first TBTT 162. For example, the advertisement schedule 174 may indicate the second TBTT 164 in response to determining that the second beacon 144 advertises the first TBTT 162. The advertisement schedule 174 may indicate one or more additional TBTTs of the second beacon 144 based on a second beacon interval of the second AP 104. For example, the FD frame generator 134 may determine a particular TBTT based on a sum of the second TBTT 164 and the second beacon interval. The advertisement schedule 174 may indicate the particular TBTT in response to determining that the second beacon 144 advertises the first TBTT 162.

In a particular aspect, the FD frame generator 134 may assume that the second beacon 144 is receivable at the first location within the coverage area of the first AP 102. For example, the FD frame generator 134 may assume that the second beacon 144 is decodable by a STA (e.g., the STA 110) within a coverage area of the first AP 102. This aspect may correspond to a setting where the first AP 102 and the second AP 104 have substantially similar coverage areas (e.g., because of proximity to each other) so that the second beacon 144 is likely to be receivable by a STA within a coverage area of the first AP 102. The FD frame generator 134 may generate the advertisement schedule 174 to indicate the second TBTT 164. In an alternate aspect, the FD frame generator 134 may generate the advertisement schedule 174 to indicate the second TBTT 164 in response to determining that the second beacon 144 is receivable at the first location, as described herein.

The FD frame generator 134 may determine that the second beacon 144 is receivable (e.g., decodable by a STA) at the first location in response to determining that a beacon report has been received from a STA (e.g., the STA 110), that the beacon report indicates that the STA (e.g., the STA 110) received the second beacon 144, and that a location of the STA (e.g., the STA 110) is proximate to (e.g., within a particular distance of) the first location.

As another example, the FD frame generator 134 may determine that the second beacon 144 is receivable (e.g., decodable by a STA) at the first location in response to determining that the second AP 104 is proximate to the first location, that the second beacon 144 was received by another AP and that the other AP is proximate to the first location, that the second beacon 144 was received by a STA (e.g., the STA 110) and that the STA is proximate to the first location, or a combination thereof. For example, the FD frame generator 134 may determine that the second beacon 144 is receivable at the first location in response to determining that a location of the second AP 104 is within a particular distance of the first location.

As a further example, the FD frame generator 134 may determine that the second beacon 144 is receivable at the first location in response to determining that an NR has been received from another AP, that the NR indicates that the other AP received the second beacon 144, and that a location of the other AP is proximate to the first location. For example, the FD frame generator 134 may determine that an NR has been received from the third AP 106, that the NR indicates that the third AP 106 received the second beacon 144, and that a location of the third AP 106 is within a particular distance of the first location.

As an additional example, the FD frame generator 134 may determine that the second beacon 144 is receivable at the first location in response to determining that an NR has been received from another AP, that the NR indicates that the other AP received a beacon report from a STA, that the beacon report indicated that the STA received the second beacon 144, and that a location of the STA is proximate to the first location. For example, the FD frame generator 134 may determine that an NR has been received from the third AP 106, that the NR indicates that the third AP 106 received a beacon report from a STA (e.g., the STA 110), that the beacon report indicated that the STA (e.g., the STA 110) received the second beacon 144, and that a location of the STA (e.g., the STA 110) is within a particular distance of the first location.

The advertisement schedule 174 may thus represent a schedule of when the first TBTT 162 is receivable at the first location, regardless of which of the first AP 102, the second AP 104, the third AP 106, and the fourth AP 108 advertises the first TBTT 162. The FD frame generator 134 may store the advertisement schedule 174 in the memory 132.

The FD frame generator 134 may generate an FD frame transmission schedule 138. The FD frame transmission schedule 138 may indicate one or more time windows during which the first AP 102 is to transmit an FD frame (e.g., because the first TBTT 162 is not receivable from another AP at at least one location within a coverage area of the first AP 102 during those time windows).

The FD frame generator 134 may generate an advertisement schedule (e.g., the advertisement schedule 174) corresponding to each of a plurality of locations (e.g., the first location). The FD frame generator 134 may generate the FD frame transmission schedule 138 based on the advertisement schedules so that the first TBTT 162 is receivable at each of the plurality locations at least once during the time windows. For example, the FD frame generator 134 may generate the FD frame transmission schedule 138 such that a device at a particular location of the plurality of locations receives the first TBTT 162 at least once during the time windows. The FD frame generator 134 may determine whether the advertisement schedule 174 indicates that the first TBTT 162 is receivable at the first location at least once during the time windows (e.g., once every 20 ms) from the first AP 102, the second AP 104, the third AP 106, the fourth AP 108, or a combination thereof. The FD frame generator 134 may generate the FD frame transmission schedule 138 to indicate that no FD frame is to be transmitted by the first AP 102 (e.g., during the time windows) in response to determining that the advertisement schedule 174 indicates that the first TBTT 162 is receivable at the first location at least once (e.g., during the time windows) from the first AP 102, the second AP 104, the third AP 106, the fourth AP 108, or a combination thereof. For example, the FD frame generator 134 may determine that the advertisement schedule 174 indicates that a device receives the first TBTT 162 at the first location at least once during the time windows from the first AP 102, the second AP 104, the third AP 106, the fourth AP 108, or a combination thereof. Alternatively, the FD frame generator 134 may generate the FD frame transmission schedule 138 to indicate that at least one FD frame is to be transmitted during the time windows in response to determining that the advertisement schedule 174 indicates that the first TBTT 162 is not receivable at the first location at least once during the time window from the first AP 102, the second AP 104, the third AP 106, the fourth AP 108, or a combination thereof, as further described with reference to FIGS. 3-4. For example, the FD frame generator 134 may determine that the advertisement schedule 174 indicates that a device does not receive the first TBTT 162 at the first location during the time window from the first AP 102, the second AP 104, the third AP 106, or the fourth AP 108. The FD frame generator 134 may generate the FD frame transmission schedule 138 to include a fewest number of FD transmission times that enable the first TBTT 162 to be receivable at the plurality of locations from the first AP 102, the second AP 104, the third AP 106, the fourth AP 108, or a combination thereof, at least once during the one or more time windows. In a particular aspect, the FD frame generator 134 may generate the FD frame transmission schedule 138 to include a fewest number of FD transmission times such that a device within a coverage area of the first AP 102 receives the first TBTT 162 at least once from the first AP 102, the second AP 104, the third AP 106, the fourth AP 108, or a combination thereof, during the one or more time windows.

Thus, the FD frame generator 134 may generate the FD frame transmission schedule 138 so that the first TBTT 162 is scheduled to be receivable at each of the plurality of locations at least once during the time windows from the first AP 102, the second AP 104, the third AP 106, the fourth AP 108, or a combination thereof. The second AP 104 may advertise the first TBTT 162 by transmitting the second beacon 144, the third AP 106 may advertise the first TBTT 162 by transmitting the third beacon 146, and the fourth AP 108 may advertise the first TBTT 162 by transmitting the fourth beacon 148. The first AP 102 may advertise the first TBTT 162 by at least one of transmitting the first beacon 142 or transmitting an FD frame, as described herein.

The FD frame transmission schedule 138 may include one or more transmission offsets 170, one or more transmission frequencies 172, or a combination thereof, as described with reference to FIGS. 3-4. The FD frame generator 134 may determine whether to transmit an FD frame 150 based on the FD frame transmission schedule 138. For example, the FD frame generator 134 may refrain from initiating transmission of the FD frame 150 in response to determining that the FD frame transmission schedule 138 indicates that no FD frame is to be transmitted by the first AP 102.

Alternatively, the FD frame generator 134 may determine that the FD frame 150 is to be transmitted in response to determining that the FD frame transmission schedule 138 indicates that at least one FD frame is to be transmitted. For example, the FD frame generator 134 may determine that the FD frame transmission schedule 138 indicates that at least one FD frame is to be transmitted in response to determining that the FD frame transmission schedule 138 includes the transmission offsets 170, the transmission frequencies 172, or a combination thereof. Each of the transmission offsets 170 may correspond to an FD frame to be transmitted, as described herein. Similarly, each of the transmission frequencies 172 may correspond to an FD frame to be transmitted, as described herein.

The FD frame generator 134 may, at a time t_now, determine an FD transmission time of the FD frame 150 based on the FD frame transmission schedule 138. For example, a particular transmission offset of the transmission offsets 170 may indicate a first time at which a first FD frame is to be transmitted after a beacon (e.g., the first beacon 142) of the first AP 102. The first beacon 142 may have been transmitted at a time t0, e.g., as indicated by a beacon transmission timestamp of the first beacon 142. The FD frame generator 134 may determine that the first FD frame is to be transmitted at a time t1, where the time t1 is a sum of the time t0 and the particular transmission offset. The FD frame generator 134 may determine that the FD transmission time is the time t1 in response to determining that the time t1 is greater than or equal to the time t_now.

As another example, a particular transmission frequency of the transmission frequencies 172 may indicate a transmission interval between subsequent FD frames. The FD frame generator 134 may determine that a previous FD frame has been transmitted at a time t0 corresponding to an FD frame transmission timestamp. For example, the FD frame generator 134 may have stored the FD frame transmission timestamp of the local clock of the first AP 102 when the previous FD frame was transmitted. The FD frame generator 134 may determine that a subsequent FD frame is to be transmitted at a time t1, where the time t1 is a sum of the time t0 and the particular transmission frequency. The FD frame generator 134 may determine that the FD transmission time is the time t1 in response to determining that the time t1 is greater than or equal to the time t_now.

The FD frame generator 134 may transmit, via the transceiver 136, the FD frame 150 at approximately the FD transmission time. The FD frame generator 134 may store an FD frame transmission timestamp in the memory 132. The FD frame transmission timestamp may indicate a time (e.g., the FD transmission time) of the local clock of the first AP 102 at a time when the FD frame 150 is transmitted.

In a particular aspect, the FD frame generator 134 may determine the FD transmission time based on a particular offset of the transmission offsets 170 in response to determining that a beacon transmission timestamp is greater than or equal to an FD frame transmission timestamp. The beacon transmission timestamp may indicate a time of the local clock at which a previous beacon has been transmitted. The FD frame transmission timestamp may indicate a time of the local clock at which a previous FD frame has been transmitted. Alternatively, the FD frame generator 134 may determine the FD transmission time based on a particular frequency of the transmission frequencies 172 in response to determining that an FD frame transmission timestamp is greater than the beacon transmission timestamp.

One or more STAs (e.g., the STA 110) may enter or exit a coverage area of the first AP 102 at various times during operation. The STA 110 may receive the first TBTT 162 by receiving the FD frame 150, the first beacon 142, the second beacon 144, the third beacon 146, the fourth beacon 148, or a combination thereof. The STA 110 may monitor a (physical) communication channel at approximately the first TBTT 162 to receive a subsequent beacon from the first AP 102. The STA 110 may refrain from monitoring the communication channel until a time just prior to the first TBTT 162 to conserve power.

In a particular aspect, the first AP 102 may conserve network resources by reducing a size of the FD frame 150 prior to transmission. For example, the first AP 102 may remove (or exclude) one or more optional fields (e.g., an AP capability field, a reduced neighbor report (RNR), etc.) of the FD frame 150. Smaller FD frames may result in less contention and greater availability of a communication medium. The first AP 102 may conserve power by transmitting a smaller FD frame.

The system 100 may thus enable the first AP 102 to conserve network resources by transmitting the FD frame 150 based on the FD frame transmission schedule 138. For example, the first AP 102 may refrain from transmitting the FD frame 150 in response to determining that the FD frame transmission schedule 138 indicates that no FD frame is to be transmitted by the first AP 102. As another example, the first AP 102 may transmit fewer FD frames based on the FD frame transmission schedule 138 when the beacons 144-148 indicate that the first TBTT 162 is already being advertised by one or more of the APs 104-148. The system 100 may also enable the STA 110 to conserve power by refraining from monitoring the communication channel until a time just prior to the first TBTT 162.

Figure 2:
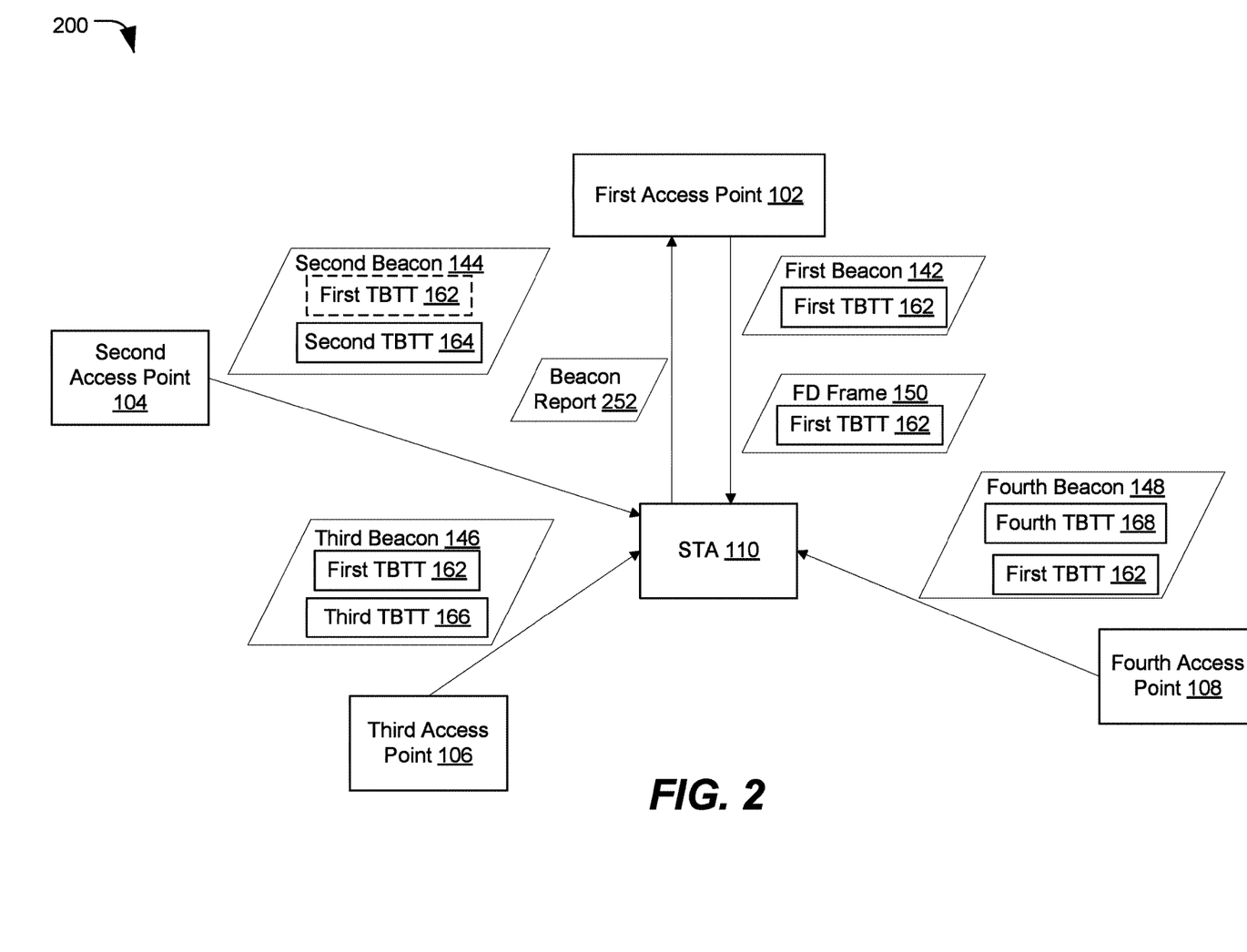
FIG. 2 is a diagram of another particular aspect of the system of FIG. 1.

Referring to FIG. 2, a diagram of a system is shown and is generally designated 200. The system 200 differs from the system 100 of FIG. 1 in that the first AP 102 may generate the FD frame transmission schedule 138 of FIG. 1 based on data received from a station (e.g., the STA 110), as described herein.

The STA 110 may receive the first beacon 142 from the first AP 102, the second beacon 144 from the second AP 104, the third beacon 146 from the third AP 106, the fourth beacon 148 from the fourth AP 108, or a combination thereof. The STA 110 may generate a beacon report 252 (e.g., a STA report) based on the first beacon 142, the second beacon 144, the third beacon 146, the fourth beacon 148, or a combination thereof. The beacon report 252 may include data associated with one or more of the first AP 102, the second AP 104, the third AP 106, and the fourth AP 108. For example, the beacon report 252 may indicate that the STA 110 received the first beacon 142, the second beacon 144, the third beacon 146, the fourth beacon 148, or a combination thereof, and the corresponding latest reception time. The beacon report 252 may also indicate the first TBTT 162 of the first beacon 142, the second TBTT 164 of the second beacon 144, the third TBTT 166 of the third beacon 146, the fourth TBTT 168 of the fourth beacon 148, or a combination thereof.

The beacon report 252 may indicate whether the second beacon 144 included the first TBTT 162, whether the third beacon 146 included the first TBTT 162, whether the fourth beacon 148 included the first TBTT 162, or a combination thereof. The STA 110 may transmit the beacon report 252. The first AP 102 may be within a coverage area of the STA 110 and may receive the beacon report 252.

In a particular aspect, the STA 110 may generate the beacon report 252 to send to the first AP 102. The STA 110 may receive the first beacon 142 from the first AP 102 at a first time of a local clock of the STA 110, may receive the second beacon 144 from the second AP 104 at a second time of the local clock of the STA 110, may receive the third beacon 146 from the third AP 106 at a third time of the local clock of the STA 110, may receive the fourth beacon 148 from the fourth AP 108 at a fourth time of the local clock of the STA 110, or a combination thereof. The first beacon 142 may indicate a first beacon interval of the first AP 102. The second beacon 144 may indicate a second beacon interval of the second AP 104. The third beacon 146 may indicate a third beacon interval of the third AP 106. The fourth beacon 148 may indicate a fourth beacon interval of the fourth AP 108. The beacon report 252 may indicate that the STA 110 received the first beacon 142 from the first AP 102 at the first time, that the STA 110 received the second beacon 144 from the second AP 104 at the second time, that the STA 110 received the third beacon 146 from the third AP 106 at the third time, that the STA 110 received the fourth beacon 148 from the fourth AP 108 at the fourth time, or a combination thereof. The beacon report 252 may indicate the first TBTT 162 as a first beacon interval indicated by the first beacon 142. The beacon report 252 may indicate the second TBTT 164 as a second offset between the first time and the second time. The beacon report 252 may indicate the third TBTT 166 as a third offset between the first time and the third time. The beacon report 252 may indicate the fourth TBTT 168 as a fourth offset between the first time and the fourth time. The beacon report 252 may include the first beacon interval, the second beacon interval, the third beacon interval, the fourth beacon interval, or a combination thereof. The STA 110 may send the beacon report 252 to the first AP 102.

The FD frame generator 134 may generate the advertisement schedule 174 based on the beacon report 252. The advertisement schedule 174 may correspond to a first location proximate to a location of the STA 110. The advertisement schedule 174 may include the first TBTT 162, as described with reference to FIG. 1. The FD frame generator 134 may determine that a TBTT of a particular AP is to be included in the advertisement schedule 174 in response to determining that the beacon report 252 indicates that a beacon of the particular AP advertises the first TBTT 162. For example, the FD frame generator 134 may determine that the second TBTT 164 is to be included in the advertisement schedule 174 in response to determining that the beacon report 252 indicates that the second beacon 144 advertises the first TBTT 162. As another example, the FD frame generator 134 may determine that the third TBTT 166 is to be included in the advertisement schedule 174 in response to determining that the beacon report 252 indicates that the third beacon 146 advertises the first TBTT 162. As a further example, the FD frame generator 134 may determine that the fourth TBTT 168 is to be included in the advertisement schedule 174 in response to determining that the beacon report 252 indicates that the fourth beacon 148 advertises the first TBTT 162.

The FD frame generator 134 may, in response to determining that the TBTT of the particular AP is to be included in the advertisement schedule 174, determine the TBTT based on a beacon from the particular AP or based on the beacon report 252. For example, the FD frame generator 134 may determine the second TBTT 164 based on the second beacon 144, as described with reference to FIG. 1, in response to determining that the beacon report 252 indicates that the second beacon 144 advertises the first TBTT 162. As another example, the FD frame generator 134 may determine the second TBTT 164 based on the beacon report 252 in response to determining that the beacon report 252 indicates that the second beacon 144 advertises the first TBTT 162. To illustrate, the FD frame generator 134 may determine that the second TBTT 164 is indicated by the second offset. In a particular aspect, the FD frame generator 134 may determine the second TBTT 164 based on the beacon report 252 in response to determining that a beacon (e.g., the second beacon 144) has not been received from the second AP 104 within a particular duration of transmitting the first beacon 142. The FD frame generator 134 may generate the advertisement schedule 174 to indicate the second TBTT 164.

The FD frame generator 134 may determine one or more additional TBTTs of a particular AP in response to determining that a TBTT of the particular AP is to be included in the advertisement schedule 174. For example, the FD frame generator 134 may determine a particular TBTT of the second AP 104 in response to determining that the second TBTT 164 is to be included in the advertisement schedule 174. The FD frame generator 134 may determine the particular TBTT based on a sum of the second TBTT 164 and a second beacon interval of the second AP 104. The FD frame generator 134 may include the particular TBTT in the advertisement schedule 174.

The FD frame generator 134 may generate the FD frame transmission schedule 138 based on the advertisement schedule 174 and may determine whether to transmit the FD frame 150 based on the FD frame transmission schedule 138, as described with reference to FIG. 1.

In a particular aspect, the FD frame generator 134 may receive, via the transceiver 136, beacon reports from multiple STAs. For example, the FD frame generator 134 may receive the beacon report 252 from the STA 110 and may receive a second beacon report from a second STA. The FD frame generator 134 may generate an advertisement schedule corresponding to each STA. For example, the FD frame generator 134 may generate the advertisement schedule 174 corresponding to the STA 110 and may generate a second advertisement schedule corresponding to the second STA. To illustrate, the advertisement schedule 174 may correspond to a first location that is proximate to a location of the STA 110. The second advertisement schedule may correspond to a second location that is proximate to a location of the second STA.

The FD frame generator 134 may determine an FD frame transmission schedule based on each advertisement schedule, as described with reference to FIG. 1. For example, the FD frame generator 134 may determine a first FD frame transmission schedule based on the advertisement schedule 174 and may determine a second FD frame transmission schedule based on the second advertisement schedule.

The FD frame generator 134 may generate an overall FD frame transmission schedule 138 so that the first TBTT 162 is receivable at each of the first location and the second location at least once during one or more time windows of a particular duration (e.g., 20 ms). The FD frame generator 134 may generate the FD frame transmission schedule 138 based on the first FD frame transmission schedule and the second FD frame transmission schedule. The FD frame generator 134 may generate the FD frame transmission schedule 138 to include a fewest number of FD transmission times that enable the first TBTT 162 to be receivable at the plurality of locations from the first AP 102, the second AP 104, the third AP 106, the fourth AP 108, or a combination thereof, at least once during the one or more time windows. For example, the first FD frame transmission schedule may indicate a first transmission offset (e.g., 40 ms) and the second FD frame transmission schedule may indicate a second transmission offset (e.g., 60 ms). The FD frame generator 134 may generate the FD frame transmission schedule 138 to include a lower transmission offset (e.g., 40 ms) of the first offset and the second offset. As another example, the first FD frame transmission schedule may indicate a first transmission frequency (e.g., once every 40 ms) and the second FD frame transmission schedule may indicate a second transmission frequency (e.g., once every 100 ms). The FD frame generator 134 may generate the FD frame transmission schedule 138 to include a higher transmission frequency (e.g., once every 40 ms) of the first transmission frequency and the second transmission frequency.

In a particular aspect, the FD frame generator 134 may generate the FD frame transmission schedule 138 so that advertisements of the first TBTT 162 are receivable by STAs at least once during the time windows at at least a particular percentage (e.g., 80%) of locations (e.g., the first location and the second location). For example, the FD frame generator 134 may generate the FD frame transmission schedule 138 based on the particular percentage of the beacon reports received at the first AP 102.

In a particular aspect, the FD frame generator 134 may determine the FD frame transmission schedule 138 based on a number of APs detected by a STA (e.g., the STA 110). For example, the FD frame generator 134 may determine that the beacon report 252 indicates that the STA 110 detected a first number of beacons (e.g., the first beacon 142, the second beacon 144, the third beacon 146, the fourth beacon 148, or a combination thereof). The FD frame generator 134 may determine a particular offset, a particular transmission frequency, or both, based on the first number. For example, the FD frame generator 134 may have access to mapping data that maps numbers of APs to offsets, transmission frequencies, or both. The mapping data may include default values, values received via user input, or both. The FD frame generator 134 may determine the particular transmission offset, the particular transmission frequency, or both, based on the mapping data and the first number. The FD frame generator 134 may generate the FD frame transmission schedule 138 to include the particular offset in the transmission offsets 170, to include the particular transmission frequency in the transmission frequencies 172, or both.

In a particular aspect, the FD frame generator 134 may receive beacon reports from multiple STAs. For example, the FD frame generator 134 may receive the beacon report 252 from the STA 110 and may receive a second beacon report from a second STA. The FD frame generator 134 may determine the first transmission offset, the first transmission frequency, or both, based on the beacon report 252 and the mapping data. The FD frame generator 134 may determine that the second STA received beacons from a second number of APs. The FD frame generator 134 may determine a second transmission offset, a second transmission frequency, or both, based on the second number and the mapping data. The FD frame generator 134 may generate the FD frame transmission schedule 138 to include a lower transmission offset (e.g., 40 ms) of the first transmission offset (e.g., 40 ms) and the second transmission offset (e.g., 80 ms) in the transmission offsets 170. The FD frame generator 134 may generate the FD frame transmission schedule 138 to include a higher transmission frequency (e.g., 40 ms) of the first transmission frequency (e.g., 40 ms) and the second transmission frequency (e.g., 100 ms) in the transmission frequencies 172.

The system 200 may enable the first AP 102 to determine the advertisement schedule 174 of advertisements of the first TBTT 162 received at a particular location (e.g., a location of the STA 110). The first AP 102 may generate the FD frame transmission schedule 138 so that at least one advertisement of the first TBTT 162 is receivable at the particular location during one or more time windows.

Figure 3:
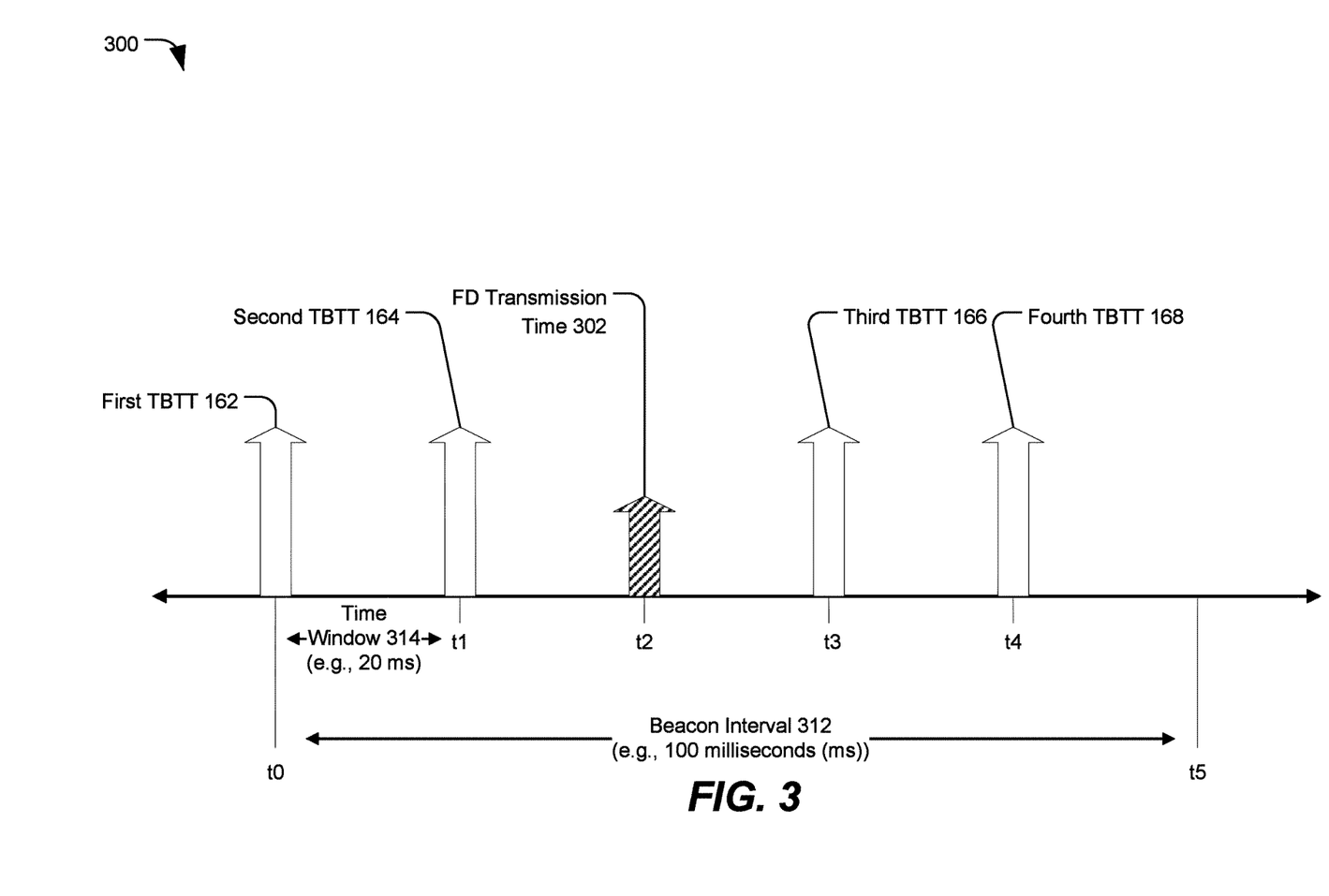
FIG. 3 is a timing diagram corresponding to operation of the system of FIG. 1.

Referring to FIG. 3, a timing diagram is shown and generally designated 300. In a particular aspect, the timing diagram 300 may correspond to operation of the system 100 of FIG. 1, the system 200 of FIG. 2, or both.

The first TBTT 162 may correspond to a time t0, the second TBTT 164 may correspond to a time t1, the third TBTT 166 may correspond to a time t3, and the fourth TBTT 168 may correspond to a time t4. Each of the first beacon 142, the second beacon 144, the third beacon 146, and the fourth beacon 148 may indicate the first TBTT 162. For example, the FD frame generator 134 of FIG. 1 may generate the advertisement schedule 174 to include the first TBTT 162, the second TBTT 164, the third TBTT 166, and the fourth TBTT 168, as described with reference to FIGS. 1-2. The FD frame generator 134 may determine the FD frame transmission schedule 138 based on the advertisement schedule 174, as described with reference to FIG. 1. The advertisement schedule 174 may correspond to a first location within a coverage area of the first AP 102. For example, the FD frame generator 134 may determine that the second TBTT 164 occurs within a time window 314 (e.g., 20 ms) of the first TBTT 162.

The FD frame generator 134 may determine an FD transmission time 302 in response to determining that the advertisement schedule 174 does not indicate a TBTT within the time window 314 of the second TBTT 164. For example, the FD transmission time 302 may be a sum of the second TBTT 164 and the time window 314. The FD frame generator 134 may generate (or update) the FD frame transmission schedule 138 to indicate the FD transmission time 302, as described herein. The FD frame generator 134 may determine that the third TBTT 166 occurs within the time window 314 of the FD transmission time 302. The FD frame generator 134 may determine that the fourth TBTT 168 occurs within the time window 314 from the third TBTT 166. The FD frame generator 134 may determine that generation of the FD frame transmission schedule 138 is complete in response to determining that an end of a beacon interval 312 (e.g., from t0 to t5) occurs within the time window 314 of the fourth TBTT 168.

The FD frame generator 134 may thus generate the FD frame transmission schedule 138 so that, during the beacon interval 312, the first TBTT 162 is receivable at the first location at least once during each time window. For example, the first TBTT 162 may be scheduled to be transmitted by one or more of the first AP 102, the second AP 104, the third AP 106, and the fourth AP 108 at least once during each 20 millisecond time window of a 100 millisecond beacon interval (e.g., the beacon interval 312) between the first beacon 142 and a subsequent beacon of the first AP 102. For example, the subsequent beacon of the first AP 102 may be scheduled to be transmitted at the time t5.

The FD frame generator 134 may generate the FD frame transmission schedule 138 to indicate the FD transmission time 302 as a particular offset of the transmission offsets 170 of FIG. 1. For example, the particular offset may correspond to a difference between the time t0 and the time t2.

In a particular aspect, the FD frame generator 134 may generate the FD frame transmission schedule 138 so that, during the beacon interval 312, the first TBTT 162 is receivable at a plurality of locations at least once during each time window, as described with reference to FIG. 2. For example, the FD frame generator 134 may generate a first FD frame transmission schedule based on the advertisement schedule 174 corresponding to a first location, as described herein. The FD frame generator 134 may generate a second FD frame transmission schedule based on a second advertisement schedule corresponding to a second location. The FD frame generator 134 may generate the FD frame transmission schedule 138 (e.g., an overall FD frame transmission schedule) based on the first FD frame transmission schedule and the second FD frame transmission schedule, as described with reference to FIG. 2.

The FD frame generator 134 may transmit, via the transceiver 136 of FIG. 1, the FD frame 150 of FIG. 1 based on the FD frame transmission schedule 138, as described with reference to FIG. 1. For example, the FD frame generator 134 may transmit the FD frame 150 at approximately the FD transmission time 302.

The first AP 102 may conserve network resources by transmitting the FD frame 150 based on the FD frame transmission schedule 138. For example, the first AP 102 may transmit a single FD frame (e.g., the FD frame 150) at the FD transmission time 302 during the beacon interval 312, as compared to transmitting an FD frame at each of the time t1, the time t2, the time t3, and the time t4.

Figure 4:
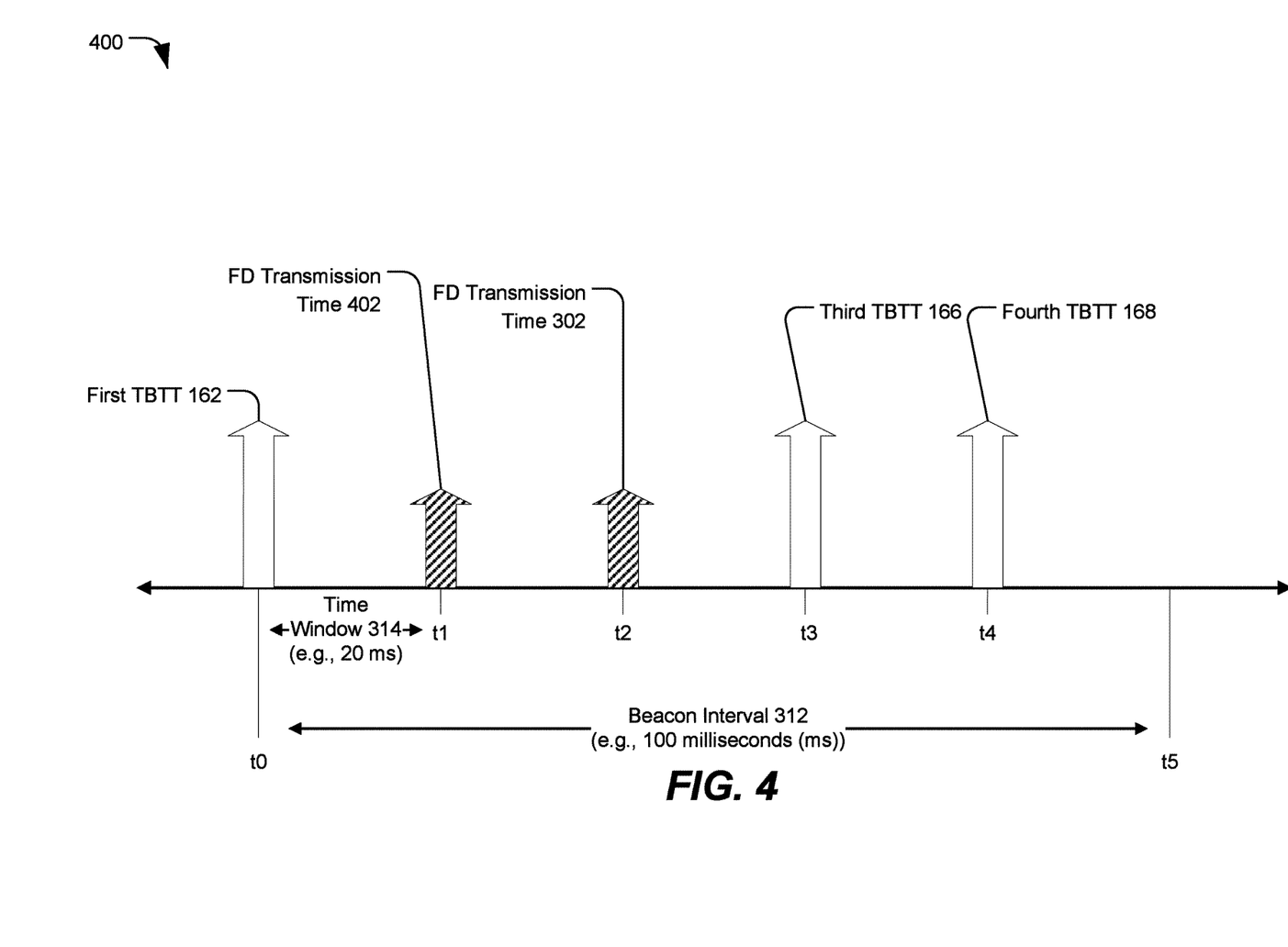
FIG. 4 is a timing diagram corresponding to operation of the system of FIG. 1.

Referring to FIG. 4, a timing diagram is shown and generally designated 400. In a particular aspect, the timing diagram 400 may correspond to operation of the system 100 of FIG. 1, the system 200 of FIG. 2, or both.

The timing diagram 400 differs from the timing diagram 300 in that the FD frame generator 134 generates the FD frame transmission schedule 138 to include a plurality of frame transmission times (e.g., an FD transmission time 402 and the FD transmission time 302), as described herein.

In the example of FIG. 4, the FD frame generator 134 may determine that the second beacon 144 of FIG. 1 does not advertise the first TBTT 162. For example, the FD frame generator 134 may determine that the second beacon 144 does not advertise the first TBTT 162 in response to receiving the second beacon 144 and determining that the second beacon 144 excludes the first TBTT 162, as described with reference to FIG. 1. As another example, the FD frame generator 134 may determine that the second beacon 144 does not advertise the first TBTT 162 in response to receiving the beacon report 252 of FIG. 2 from the STA 110 and determining that the beacon report 252 indicates that the second beacon 144 excludes the first TBTT 162, as described with reference to FIG. 2.

The FD frame generator 134 may disregard the second TBTT 164 in determining one or more advertisement schedules (e.g., the advertisement schedule 174). For example, the FD frame generator 134 may exclude the second TBTT 164 from the advertisement schedule 174. The FD frame generator 134 may generate the advertisement schedule 174 to include the first TBTT 162, the third TBTT 166, and the fourth TBTT 168. The advertisement schedule 174 may correspond to a first location within a coverage area of the first AP 102, as described with reference to FIGS. 1-2. The FD frame generator 134 may determine an FD transmission time 402 in response to determining that the advertisement schedule 174 does not indicate a TBTT within the time window 314 of the first TBTT 162. For example, the FD frame generator 134 may determine the FD transmission time 402 by adding the time window 314 to the first TBTT 162. The FD frame generator 134 may generate (or update) the FD frame transmission schedule 138 to indicate the FD transmission time 402, as described herein.

The FD frame generator 134 may similarly determine the FD transmission time 302 in response to determining that the advertisement schedule 174 does not indicate a TBTT within the time window 314 from the FD transmission time 402. For example, the FD frame generator 134 may determine the FD transmission time 302 by adding the time window 314 to the FD transmission time 402. The FD frame generator 134 may generate (or update) the FD frame transmission schedule 138 to indicate the FD transmission time 302, as described with herein.

The FD frame generator 134 may determine that the third TBTT 166 is within the time window 314 of the FD transmission time 302. The FD frame generator 134 may determine that the fourth TBTT 168 is within the time window 314 of the third TBTT 166. The FD frame generator 134 may determine that the FD frame transmission schedule 138 is complete in response to determining that an end of the beacon interval 312 occurs within the time window 314 of the fourth TBTT 168.

The FD frame generator 134 may thus generate the FD frame transmission schedule 138 so that, during the beacon interval 312, the first TBTT 162 is scheduled to be receivable at the first location at least once during each time window. For example, the first TBTT 162 may be scheduled to be transmitted by one or more of the first AP 102, the third AP 106, and the fourth AP 108 at least once during each 20 millisecond time window of a 100 millisecond beacon interval (e.g., the beacon interval 312).

The FD frame generator 134 may generate the FD frame transmission schedule 138 to indicate the FD transmission time 402 as a particular offset of the transmission offsets 170 of FIG. 1. For example, the particular offset may correspond to a difference between the time t0 and the time t1.

The FD frame generator 134 may generate the FD frame transmission schedule 138 to indicate the FD transmission time 302 as a second offset of the transmission offsets 170 of FIG. 1 or as a particular frequency of the transmission frequencies 172 of FIG. 1. For example, the second offset may correspond to a difference between the time t0 and the time t2. As another example, the particular frequency may correspond to a difference between the time t2 and the time t1. The particular frequency may indicate that multiple FD frames are to be transmitted by the first AP 102. For example, the particular frequency may indicate that a second FD frame is to be transmitted at the time t2, where the time t2 is a sum of the time t1 and the particular frequency. The particular frequency may indicate that a third FD frame is to be transmitted at the time t3, where the time t3 is a sum of the time t2 and the particular frequency, and so on, until an end of the beacon interval 312.

The FD frame generator 134 may transmit, via the transceiver 136 of FIG. 1, the FD frame 150 of FIG. 1 based on the FD frame transmission schedule 138, as described with reference to FIG. 1. For example, the FD frame generator 134 may transmit the FD frame 150 at approximately the FD transmission time 402 based on the particular offset. The FD frame generator 134 may transmit a second FD frame at approximately the FD transmission time 302 based on the second offset.

In a particular aspect, the FD frame generator 134 may transmit the second FD frame at approximately the FD transmission time 302 (e.g., the time t2) based on the particular frequency. For example, the FD frame generator 134 may determine the FD transmission time 302 (e.g., the time t2) by adding the particular frequency to the FD transmission time 402 (e.g., the time t1). The FD frame generator 134 may transmit the second FD frame at approximately the FD transmission time 302 (e.g., the time t2). The FD frame generator 134 may transmit another FD frame at another FD transmission time (e.g., the time t3), where the other FD transmission time (e.g., the time t3) is a sum of the FD transmission time 302 (e.g., the time t2) and the particular frequency, and so on, until detecting the end of the beacon interval 312.

The first AP 102 may conserve network resources by transmitting the FD frame 150 based on the FD frame transmission schedule 138. For example, the first AP 102 may transmit fewer FD frames (e.g., the FD frame 150 and a second FD frame) during the beacon interval 312, as compared to transmitting an FD frame at each of the time t1, the time t2, the time t3, and the time t4.

Figure 5:
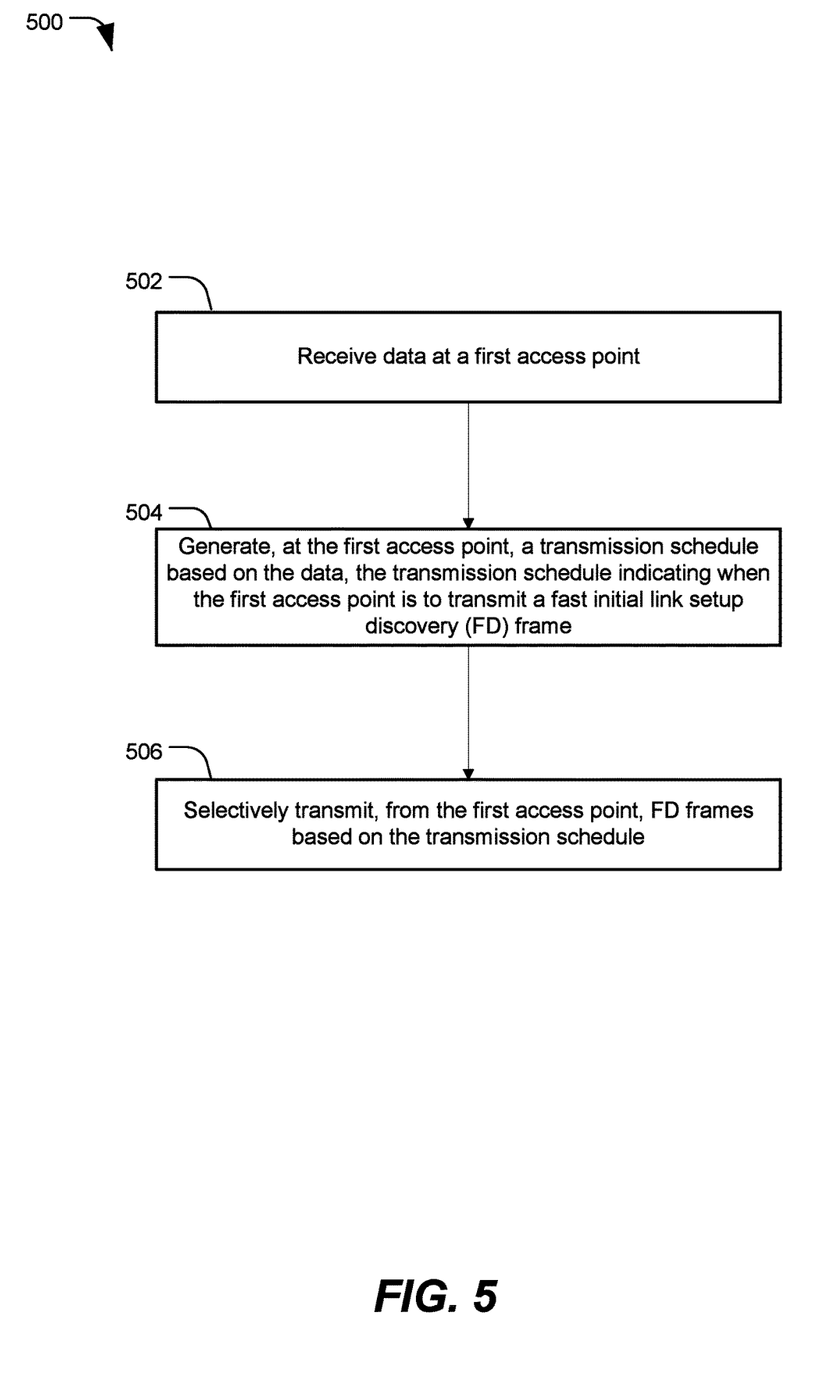
FIG. 5 is a flow chart of a method of operation at an access point of the system of FIG. 1.

Referring to FIG. 5, a particular aspect of a method of operation is shown and generally designated 500. In a particular aspect, the method 500 may be performed by the FD frame generator 134 of FIG. 1.

The method 500 includes receiving data at a first access point, at 502. For example, the FD frame generator 134 of FIG. 1 may receive the second beacon 144 from the second AP 104, the third beacon 146 from the third AP 106, the fourth beacon 148 from the fourth AP 108, or a combination thereof, as described with reference to FIG. 1. The second AP 104, the third AP 106, the fourth AP 108, or a combination thereof, may be located within a geographical area. To illustrate, the second AP 104, the third AP 106, the fourth AP 108, or a combination thereof, may be located within a coverage area of the first AP 102. As another example, the FD frame generator 134 of FIG.1 may receive the beacon report 252 of FIG. 2 from the STA 110, as described with reference to FIG. 2.

The method 500 also includes generating, at the first access point, a transmission schedule based on the data, at 504. For example, the FD frame generator 134 of FIG. 1 may generate the FD frame transmission schedule 138 based on the second beacon 144, the third beacon 146, the fourth beacon 148, the beacon report 252, or a combination thereof, as described with reference to FIGS. 1-2. The FD frame transmission schedule 138 may indicate when the first access point 102 is to transmit a FD frame.

The method 500 further includes selectively transmitting, from the first access point, FD frames on the transmission schedule, at 506. For example, the FD frame generator 134 may selectively transmit the FD frame 150 at one or more times based on the FD frame transmission schedule, as described with reference to FIG. 1.

The method 500 may thus enable the first AP 102 to conserve network resources by transmitting the FD frame 150 based on the FD frame transmission schedule 138, as opposed to once during each time window. For example, the first AP 102 may refrain from transmitting the FD frame 150 in response to determining that the FD frame transmission schedule 138 indicates that no FD frame is to be transmitted by the first AP 102. As another example, the first AP 102 may transmit fewer FD frames based on the FD frame transmission schedule 138 when the second beacon 144 indicates that the first TBTT 162 is being advertised by the second AP 104, the third beacon 146 indicates that the first TBTT 162 is being advertised by the third AP 106, the fourth beacon 148 indicates that the first TBTT 162 is being advertised by the fourth AP 108, or a combination thereof.

Referring to FIG. 6, a block diagram of a particular illustrative aspect of a device is depicted and generally designated 600. The device 600 includes a processor 610, such as a DSP, coupled to the memory 132. The processor 610 may include, or be coupled to, the FD frame generator 134.

The processor 610 may be configured to execute one or more instructions stored in the memory 132. For example, the memory 132 may be a non-transient computer-readable storage medium storing instructions that when executable by the processor to perform operations. In an illustrative aspect, the processor 610 may operate according to one or more methods or operations described herein. For example, the processor 610 may receive, via transceiver 136, data associated with the second AP 104, the third AP 106, the fourth AP 108, or a combination thereof. The processor 610 may generate the FD frame transmission schedule 138 of FIG. 1 based on the data. The processor 610 may determine whether to transmit an FD frame based on the FD frame transmission schedule 138. The processor 610 may transmit, via the transceiver 136, the FD frame based on the determination.

FIG. 6 also shows a display controller 626 that is coupled to the processor 610 and to a display 628. A coder/decoder (CODEC) 634 can also be coupled to the processor 610. A speaker 636 and a microphone 638 can be coupled to the CODEC 634.

FIG. 6 also indicates that the transceiver 136 can be coupled to the processor 610 and to a wireless antenna 642. In a particular aspect, the processor 610, the display controller 626, the memory 132, the CODEC 634, and the transceiver 136 are included in a system-in-package or system-on-chip device 622. In a particular aspect, an input device 630 and a power supply 644 are coupled to the system-on-chip device 622. Moreover, in a particular aspect, as illustrated in FIG. 6, the display 628, the input device 630, the speaker 636, the microphone 638, the wireless antenna 642, and the power supply 644 are external to the system-on-chip device 622. However, each of the display 628, the input device 630, the speaker 636, the microphone 638, the wireless antenna 642, and the power supply 644 can be coupled to a component of the system-on-chip device 622, such as an interface or a controller.

In conjunction with the described aspects, an apparatus is disclosed that may include means for receiving data, such as the transceiver 136, one or more other devices or circuits configured to receive data, or a combination thereof.

The apparatus may also include means for generating FD frames configured to determine a transmission schedule based on the data, and to selectively initiate transmission of the FD frames based on the frame transmission schedule, such as the FD frame generator 134, the processor 610, one or more other devices or circuits configured to determine a transmission schedule, and to selectively initiate transmission the FD frames based on the transmission schedule, or a combination thereof. The transmission schedule may indicate when an FD frame is to be transmitted.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in RAM, flash memory, ROM, programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method for communication, the method comprising:
receiving data at a first access point, the first access point associated with a first target beacon transmit time (TBTT), wherein the data indicates a second TBTT of a second access point of a network;
generating, at the first access point, a transmission schedule based on the data, the transmission schedule indicating when the first access point is to transmit a fast initial link setup discovery (FD) frame and indicating the first TBTT and the second TBTT; and
selectively transmitting, from the first access point, FD frames at a frequency based on the transmission schedule.

2. The method of claim 1, wherein the data further indicates when the first TBTT of the first access point is scheduled to be advertised by one or more of a set of access points.

3. The method of claim 1, further comprising:
determining, at the first access point, a transmission time based on the transmission schedule; and
transmitting a first FD frame of the FD frames at the transmission time.

4. The method of claim 3, wherein the transmission schedule includes at least one of a transmission frequency or a transmission offset relative to the first TBTT of the first access point.

5. The method of claim 1, wherein the first TBTT of the first access point is advertised by the first access point by transmitting a first TBTT offset in a first FD frame of the FD frames, and the TBTT is derivable based on the first TBTT offset and an FD reception time of the first FD frame.

6. The method of claim 1, wherein the first TBTT of the first access point is advertised by the first access point by transmitting a second TBTT offset in a beacon, and the TBTT is derivable based on the second TBTT offset and a beacon reception time of the beacon.

7. The method of claim 1, wherein the first TBTT of the first access point is advertised in a first beacon by a second access point of a set of access points, wherein the first beacon includes a neighbor TBTT offset, and the first TBTT is derivable based on the neighbor TBTT offset and the second TBTT of the second access point.

8. The method of claim 7, wherein the first beacon further includes a TBTT offset of the second access point, and the second TBTT is derivable based on a beacon reception time of the first beacon and the TBTT offset.

9. The method of claim 1, further comprising determining a first location that is within a coverage area of the first access point, wherein the transmission schedule is generated such that a device at the first location receives the first TBTT of the first access point from a set of access points at least once during one or more time windows.

10. The method of claim 1, further comprising:
determining a plurality of locations that are within a coverage area of the first access point, the plurality of locations including a first location,
wherein the transmission schedule is generated such that a device at the first location receives the first TBTT of the first access point from a set of access points at least once during one or more time windows.

11. The method of claim 10, further comprising determining that the device at the first location receives the first TBTT in response to determining that an advertisement indicating the first TBTT from at least one access point of the set of access points is decodable by a station (STA) at the first location.

12. The method of claim 10, wherein a particular duration of the one or more time windows corresponds to a first duration of a scan window of a station (STA).

13. The method of claim 1, wherein the transmission schedule is generated to include a fewest number of FD transmission times such that a device within a coverage area of the first access point receives the first TBTT of the first access point at least once from a set of access points during one or more time windows.

14. The method of claim 1, wherein the data is received by the first access point in a first beacon from a second access point of a set of access points, and wherein the first beacon indicates a the second TBTT of the second access point.

15. The method of claim 14, wherein the first beacon includes a first beacon interval indicating an offset between a transmission time of the first beacon and the second TBTT.

16. The method of claim 14, wherein the transmission schedule is generated based on the second TBTT in response to determining that the first beacon includes the first TBTT of the first access point.

17. The method of claim 1, wherein the data includes a beacon report received by the first access point from a station, wherein the beacon report indicates the second TBTT of the second access point of a set of access points and a first beacon interval of the second access point, and wherein the TBTT and the first beacon interval are received by the station in a beacon from the second access point.

18. The method of claim 17, wherein the transmission schedule is generated based on the second TBTT and the first beacon interval in response to determining that the beacon report indicates that the beacon includes the first TBTT of the first access point.

19. The method of claim 1, further comprising reducing, at the first access point, a size of a first FD frame of the FD frames prior to transmission of the first FD frame.

20. The method of claim 19, wherein the size of the first FD frame is reduced by excluding at least one of a reduced neighbor report (RNR) or an access point capability field from the first FD frame.

21. A computer-readable storage device for communication, the computer-readable storage device storing instructions that when executed by a processor cause the processor to perform operations comprising:
- receiving data at a first access point, the first access point associated with a first target beacon transmit time (TBTT), wherein the data indicates a second TBTT of a second access point of a network;
- generating, at the first access point, a transmission schedule based on the data, the transmission schedule indicating when the first access point is to transmit a fast initial link setup discovery (FD) frame and indicating the first TBTT and the second TBTT; and
- selectively transmitting, from the first access point, FD frames at a frequency based on the transmission schedule.

22. The computer-readable storage device of claim 21, wherein a first FD frame of the FD frames is transmitted in response to determining that the transmission schedule includes at least one of a transmission frequency or a transmission offset relative to the first TBTT of the first access point.

23. The computer-readable storage device of claim 21, wherein the transmission schedule includes a plurality of transmission offsets relative to the first TBTT of the first access point.

24. The computer-readable storage device of claim 21, wherein the operations further comprise determining a first location that is within a coverage area of the first access point, and wherein the transmission schedule is generated such that a device at the first location receives the first TBTT of the first access point from a set of access points at least once during one or more time windows.

25. The computer-readable storage device of claim 24,
- wherein the device at the first location receives the first TBTT from the first access point, the set of access points, or a combination thereof, and
- wherein the first TBTT of the first access point is advertised by the first access point by at least one of transmitting the FD frames or transmitting a beacon.

26. An access point comprising:
- a transmitter;
- a receiver configured to receive data, the access point associated with a first target beacon transmit time (TBTT), wherein the data indicates a second TBTT of a second access point of a network; and
- a fast initial link setup discovery (FD) frame generator configured to:
  - generate a transmission schedule based on the data, the transmission schedule indicating when the transmitter is to transmit an FD frame and indicating the first TBTT and the second TBTT; and
  - selectively transmit, via the transmitter, FD frames at a frequency based on the transmission schedule.

27. The access point of claim 26, further comprising a memory configured to store the transmission schedule.

28. The access point of claim 26, wherein the FD frame generator is configured to determine a transmission time based on the transmission schedule and to transmit a first FD frame of the FD frames at the transmission time.

29. The access point of claim 26,
- wherein the receiver is configured to receive the data from a station,
- wherein the data includes a beacon report of the station,
- wherein the beacon report includes a first TBTT offset, and
- wherein the transmission schedule is generated based on the first TBTT offset in response to determining that the beacon report indicates that the station received the first TBTT offset in a beacon from the second access point of a set of access points.

30. The access point of claim 29, wherein the first TBTT offset indicates a difference between the first TBTT of the access point and the second TBTT of the second access point.

* * * * *